(12) United States Patent
Inoue et al.

(10) Patent No.: US 10,249,076 B2
(45) Date of Patent: Apr. 2, 2019

(54) IMAGE PROCESSING APPARATUS, IMAGE CAPTURING APPARATUS, IMAGE PROCESSING METHOD AND STORAGE MEDIUM STORING IMAGE PROCESSING PROGRAM

(71) Applicant: CANON KABUSHIKI KAISHA, Tokyo (JP)

(72) Inventors: Chiaki Inoue, Utsunomiya (JP); Yoshiaki Ida, Utsunomiya (JP); Yuichi Kusumi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 58 days.

(21) Appl. No.: 15/407,316

(22) Filed: Jan. 17, 2017

(65) Prior Publication Data

US 2017/0206704 A1    Jul. 20, 2017

(30) Foreign Application Priority Data

Jan. 19, 2016    (JP) .................................. 2016-007693

(51) Int. Cl.
*G06T 7/60*    (2017.01)
*G06T 7/55*    (2017.01)
(Continued)

(52) U.S. Cl.
CPC .............. *G06T 15/506* (2013.01); *G06T 7/50* (2017.01); *G06T 11/60* (2013.01); *G06T 15/50* (2013.01); *H04N 5/2621* (2013.01); *H04N 5/2628* (2013.01); *G06T 2207/10028* (2013.01); *G06T 2207/10152* (2013.01); *G06T 2215/12* (2013.01); *H04N 2005/2726* (2013.01)

(58) Field of Classification Search
None
See application file for complete search history.

(56) References Cited

U.S. PATENT DOCUMENTS 8,988,549 B2 *   3/2015   Kitajima .................. G06K 9/46
                                                                348/223.1
9,129,188 B2 *   9/2015   Hata ..................... G06K 9/4652
(Continued)

FOREIGN PATENT DOCUMENTS

JP      2010122158 A      6/2010
JP      2010231620 A     10/2010

*Primary Examiner* — Martin Mushambo
(74) *Attorney, Agent, or Firm* — Rossi, Kimms & McDowell LLP

(57) ABSTRACT

The image processing apparatus produces a virtual light source image that is an image of an object lighted by a virtual light source. The apparatus includes a shape acquirer configured to acquire shape information relating to a shape of the object, a light source condition setter configured to set a first virtual light source condition as a condition relating to a virtual light source, depending on an image capturing mode indicating a type of a captured image acquired by image capturing of the object, on image type information indicating a selected one of multiple types of the virtual light source images or on an image capturing condition selected in the image capturing. The apparatus further includes an image producer configured to produce the virtual light source image by using the first virtual light source condition and the shape information.

14 Claims, 7 Drawing Sheets

(51) Int. Cl.

| | |
|---|---|
| *G06T 7/586* | (2017.01) |
| *G06T 15/50* | (2011.01) |
| *G06T 7/50* | (2017.01) |
| *G06T 11/60* | (2006.01) |
| *H04N 5/262* | (2006.01) |
| *H04N 5/272* | (2006.01) |

(56) References Cited

U.S. PATENT DOCUMENTS

| | | | |
|---|---|---|---|
| 9,338,419 B2 * | 5/2016 | Kitajima | G06K 9/46 |
| 2003/0052991 A1 * | 3/2003 | Stavely | H04N 5/232 |
| | | | 348/370 |
| 2009/0002268 A1 * | 1/2009 | Ueta | B60K 35/00 |
| | | | 345/7 |
| 2010/0134495 A1 * | 6/2010 | Matsui | G06T 15/50 |
| | | | 345/426 |
| 2012/0120071 A1 * | 5/2012 | Thorn | G06T 15/506 |
| | | | 345/420 |
| 2014/0147090 A1 * | 5/2014 | Kitajima | H04N 5/772 |
| | | | 386/224 |
| 2014/0147091 A1 * | 5/2014 | Kitajima | H04N 5/772 |
| | | | 386/224 |
| 2014/0307117 A1 * | 10/2014 | Feng | H04N 5/2355 |
| | | | 348/218.1 |
| 2016/0127630 A1 * | 5/2016 | Kitajima | G06T 5/008 |
| | | | 348/370 |

\* cited by examiner

IMAGE PROCESSING APPARATUS, IMAGE CAPTURING APPARATUS, IMAGE PROCESSING METHOD AND STORAGE MEDIUM STORING IMAGE PROCESSING PROGRAM

BACKGROUND OF THE INVENTION

Field of the Invention

The present invention relates to an image processing technique to produce an image of an object lighted by a virtual light source.

Description of the Related Art

A technique to produce (reproduce), from a captured image acquired by image capturing of an actual object under a certain light source environment (light source condition), an object image under a virtually set light source environment by performing image processing such as computer graphics (CG) is called "relighting".

The image reproduction by the relighting uses physical information on object's shape, reflection characteristic and others.

When the object physical information is unknown, shape information indicating the object's shape is acquired from information on a distance measured using a method such as laser triangulation or a twin-lens stereo method. In addition, the shape information can be acquired, as disclosed in Japanese Patent Laid-Open No. 2010-122158, by a photometric stereo method or the like, as not information indicating a three-dimensional shape but surface normal information indicating surface normals to the object. The reflection characteristic can be acquired from an image produced by image capturing of the object while changing the light source environment and a viewing axis direction. Furthermore, the reflection characteristic is also expressed, in addition to use of the surface normal information, as a model of a Bi-Directional Reflectance Distribution Function (BRDF) or the like.

Japanese Patent Laid-Open No. 2010-231620 discloses a method of editing a three-dimensional CG image. This method sets a reflection region where light is reflected on a three-dimensional model by using three-dimensional shape data and viewpoint data and performs light source setting depending on the reflection region.

However, to set the light source condition, as well as when performing actual image capturing, an editor repeats editing works while changing setting of the light source condition many times until a desired object image is obtained. Such a conventional method of setting the light source condition increases a work load of the editor. Furthermore, it is not realistic to cause an editor unfamiliar with three-dimensional CG image editing works to perform such an editing work.

The method disclosed in Japanese Patent Laid-Open No. 2010-231620 sets the reflection region on the three-dimensional model to reduce the work load in setting the light source condition. However, this method requires a special work for setting the reflection region, which insufficiently reduces the work load in setting the light source condition.

SUMMARY OF THE INVENTION

The present invention provides an image processing apparatus and others capable of providing a desired image while sufficiently reducing a work load in setting a light source condition.

The present invention provides as an aspect thereof an image processing apparatus configured to produce a virtual light source image that is an image of an object lighted by a virtual light source. The apparatus includes a shape acquirer configured to acquire shape information relating to a shape of the object, a light source condition setter configured to set a first virtual light source condition as a condition relating to a virtual light source, depending on an image capturing mode indicating a type of a captured image acquired by image capturing of the object, on image type information indicating a selected one of multiple types of the virtual light source images or on an image capturing condition selected in the image capturing, and an image producer configured to produce the virtual light source image by using the first virtual light source condition and the shape information.

The present invention provides as another aspect thereof an image capturing apparatus including the above image processing apparatus.

The present invention provides as yet another aspect thereof an image processing method for producing a virtual light source image that is an image of an object lighted by a virtual light source. The method includes a step of acquiring shape information relating to a shape of the object, a step of setting a first virtual light source condition as a condition relating to a virtual light source, depending on an image capturing mode indicating a type of a captured image acquired by image capturing of the object, on image type information indicating a selected one of multiple types of the virtual light source images or on an image capturing condition selected in the image capturing, and a step of producing the virtual light source image by using the first virtual light source condition and the shape information.

The present invention provides as still another aspect thereof a non-transitory computer-readable storage medium storing an image processing program for causing a computer to produce the virtual light source image according to the above image processing method.

Further features and aspects of the present invention will become apparent from the following description of exemplary embodiments with reference to the attached drawings.

DESCRIPTION OF THE EMBODIMENTS

Figure 1:
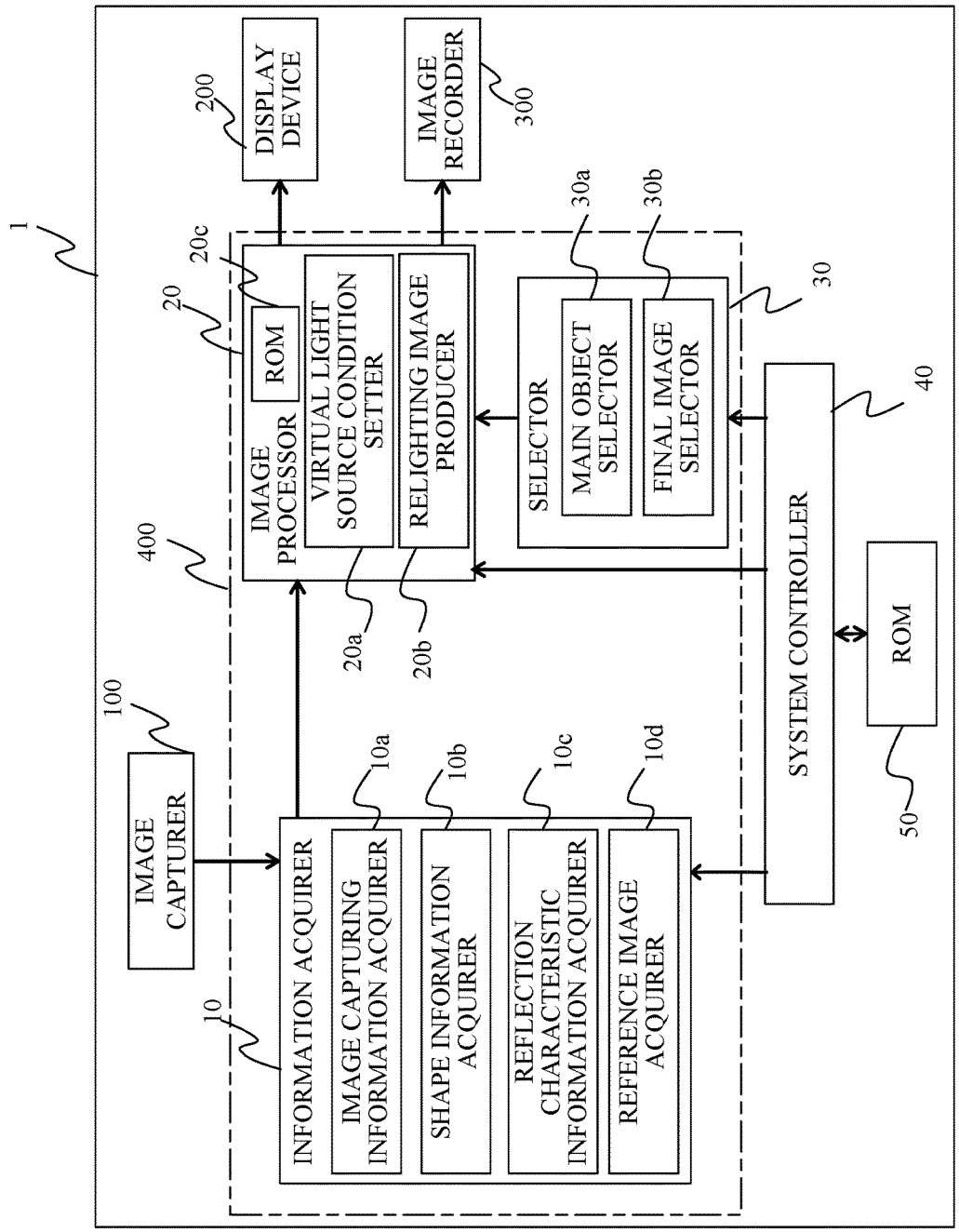
FIG. 1 is a block diagram illustrating a configuration of an image processing apparatus that is Embodiment 1 of the present invention.

Exemplary embodiments of the present invention will hereinafter be described with reference to the accompanying drawings.

First, prior to description of specific embodiments, description will be made of matters common to the embodiments. Each of the embodiments performs "relighting" to produce (reproduce), by image processing, a virtual light source image as an object image under a virtually set light source environment. The virtual light source image (hereinafter referred to as "a relighting image") is produced depending physically on shape information indicating a shape of an object, reflection characteristic information indicating a reflection characteristic of the object and information on a light source (light source condition).

The shape information includes three-dimensional (3D) shape information and distance information. The distance information can be acquired using a known method such as laser triangulation or a twin-lens stereo method. Use of surface normal information indicating surface normal to a surface of the object is also effective. This is because physical behaviors of light rays emitted from a light source and reflected by the object depend on local surface normals to the object. Thus, when the 3D shape information and the distance information are acquired as the object's shape information, it is necessary to acquire the surface normal information from these 3D shape information and distance information. The surface normal information means vectors (surface normal vectors) indicating surface normal directions, freedom degrees of the surface normals and others. Methods for directly acquiring the surface normal information include known methods such as a method using polarized light and a photometric stereo method.

The reflection characteristic means, when light from a light source reaches the object with a fixed intensity, intensities of reflected light rays each uniquely determined in relation to a direction of the light source. In general, the reflection characteristic f depending on the surface normals to the object and viewing axis directions (observation directions) in which the object is observed is expressed as follows.

$$i = E \cdot f(s, v, n, X) \quad (1)$$

In expression (1), i represents a luminance of the reflected light ray, E represents a luminance of a reaching light, s represents a unit vector (light source direction vector) indicating a direction from the object toward the light source, n represents a unit surface normal vector of the object and v represents a unit vector (viewing axis vector) indicating the observation direction to the object. When the reflection characteristic is expressed as a parametric model, a coefficient vector X of that reflection characteristic model is used as a variable. The coefficient vector X has dimensions equal to the number of coefficients of the model.

The reflection characteristic information means the reflection characteristic f and the coefficients of the reflection characteristic model. The parametric model includes, for example, a Lambert reflection model, an Oren-Nayer model, a Phong model, a Torrance-Sparrow model and a Cook-Torrance model. Each of these models can be applied to limited objects. For example, the Lambert reflection model not dependent on the viewing axis direction can be applied to an object uniformly diffusing reflected light rays, and on the other hand, other models dependent on the viewing axis vector should be applied to an object whose appearance changes depending on the viewing axis direction. The above models are often used in combination with each other. For example, separate models are used to express a diffused reflection component and a specular (mirror) reflection component, and the reflection characteristic of the object can be expressed by the sum of these models.

A specular reflected light as the specular reflection component means a reflected light subjected to specular reflection at an object's surface, that is, to Fresnel reflection according to Fresnel's formula at the object's surface (interface). A diffused reflected light as the diffused reflection component means a light transmitted through an object's surface and then scattered inside the object to be returned therefrom. In general, a reflected light from an object includes such a specular reflected light and a diffused reflected light.

The light source condition includes an intensity, a position, a direction (azimuth), a wavelength, a size and a frequency characteristic of the light source (hereinafter respectively referred to as "a light source intensity", "a light source position", "a light source direction", "a light source wavelength", "a light source size" and "a light source frequency characteristic").

The shape information and reflection characteristic information of the object both indicating physical characteristics specific to the object can be uniquely acquired by the above described methods. However, the light source condition that affects expression of the object in a captured image is set with a lot of freedom degrees, which allows an editor who edits the image to reproduce various expressions and, on the other hand, which increases a work load of the editor. Each of the embodiments described below can solve such a problem.

Embodiment 1

Figure 2:
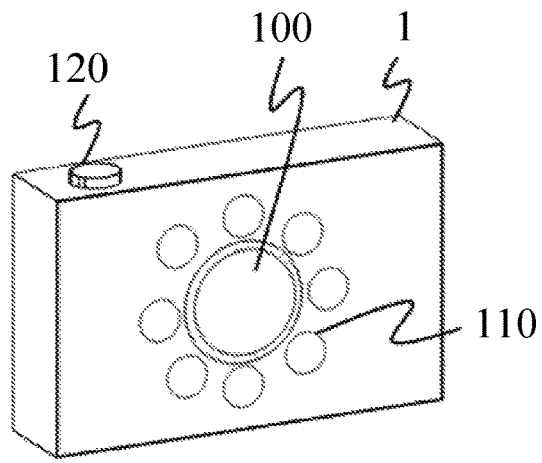
FIG. 2 is a perspective view of a camera including the image processing apparatus of Embodiment 1.

FIG. 1 illustrates a configuration of an image capturing apparatus (hereinafter referred to as "a camera") 1 including an image processing apparatus 400 that is a first embodiment (Embodiment 1) of the present invention. FIG. 2 illustrates an exterior of the camera 1.

The camera 1 includes, as illustrated in FIG. 1, an image capturer 100 configured to perform image capturing of an object (not illustrated). The image capturer 100 includes an image capturing optical system and an image sensor (both not illustrated). The image capturing optical system images light from the object on the image sensor. The image capturing optical system includes an aperture stop. In addition, the image capturing optical system may be a variable magnification optical system that moves a part or all of multiple lens units included therein to change an image capturing magnification. The image sensor is constituted by a photoelectric conversion element such as a CCD sensor or a CMOS sensor and photoelectrically converts an object image (optical image) formed by the image capturing optical system to produce a captured image.

This embodiment employs, as a method for acquiring the surface normal information, the photometric stereo method. The photometric stereo method assumes a reflection characteristic based on the surface normals of the object and the light source direction and determines the surface normals from information on luminances of the object at multiple light source positions and the assumed reflection characteristic. In order to acquire the surface normal information by the photometric stereo method, the camera 1 includes eight light sources 110 each projecting light onto the object. The photometric stereo method requires at least three light sources, so that the number of the light sources 110 is not limited to eight as long as it is at least three. Although this embodiment uses LEDs as light-emitting elements of the light sources 110, other light-emitting elements such as xenon lamps may be used. In addition, although this embodiment provides the light sources 110 to the camera 1 as built-in light sources, multiple light sources may be provided to a light source apparatus separate from the camera 1. Moreover, as the method for acquiring the surface normal information, other methods than the photometric stereo method may be used.

As illustrated in FIG. 2, the camera 1 is provided with a release button 120 for instructing AF (autofocus) and image capturing.

Next, description will be made of a configuration of the image processing apparatus 400 included in the camera 1. The image processing apparatus 400 includes an information acquirer 10, an image processor 20 and a selector 30. The image acquirer 10 includes an image capturing information acquirer 10a, a shape information acquirer 10b as a shape acquirer, a reflection characteristic information acquirer 10c as a reflection characteristic acquirer and a reference image acquirer 10d.

The image capturing information acquirer 10a acquires image capturing information. The image capturing information includes an image capturing condition selected in image capturing for acquiring the shape information or a reference image described later through the image capturer 100 and includes image type information described later. The image capturing condition is an optical condition relating to image capturing and includes a focal length, a stop value (F-number), a shutter speed and a focus position (or an object distance). The image type information includes information indicating image capturing modes relating to types of captured images such as a portrait image and a close-up image and includes information indicating a type of a relighting image selected from multiple relighting images respectively corresponding to multiple image capturing techniques whose light source conditions are mutually different. The information indicating the image capturing mode can be used for setting a representative virtual light source condition suitable (conformable) to that image capturing mode. In this embodiment, a user can input (select) the image type information as information indicating a selected relighting image capturing mode.

The shape information acquirer 10b acquires the shape information of the object through image capturing of the object performed by the image capturer 100.

The shape information includes depth information of the object and the surface normal information thereof.

The reflection characteristic information acquirer 10c acquires the reflection characteristic information of the object. The reflection characteristic information is, for example, information allocating a group of the coefficients of the parametric model to each of pixels. The reflection characteristic information may be acquired by measuring the object beforehand or may be arbitrarily set by the user. Alternatively, the reflection characteristic information indicating multiple reflection characteristics such as a reflection characteristic for the diffused reflection component and another reflection characteristic for the specular reflection component may be acquired.

The reference image acquirer 10d acquires the reference image of the object. The reference image is a normal captured image acquired by actual image capturing of the object through the image capturer 100.

The photometric stereo method has a difficulty in acquiring the surface normal information of a specular object and a transparent object. Using the surface normal information incorrectly acquired for the object in producing the relighting image may provide a low-quality relighting image causing a feeling of strangeness in object expression. On the other hand, a method for reducing image quality degradation of a produced image by using a reference image, such as a texture mapping method, is known. Thus, using the reference image is effective for increasing an image quality of the relighting image.

The image processor 20 includes a virtual light source condition setter 20a as a light source condition setter and a relighting image producer 20b as an image producer.

The virtual light source condition setter 20a sets, depending on at least the image capturing information (the relighting image capturing mode or the image capturing condition), a virtual light source condition as a first virtual light source condition that is a condition relating to a virtual light source in producing the relighting image. The virtual light source condition includes at least the light source position and the light source direction and may include the light source intensity, the light source wavelength, the light source size and the light source frequency characteristic. In addition, the virtual light source condition includes a condition of a characteristic and a position of virtual equipment corresponding to actual equipment, such as a diffuser board and a reflector board, for diffusing or reflecting light from a light source to adjust object expression. Furthermore, the virtual light source condition setter 20a can set at least one second virtual light source condition described later.

The relighting image producer 20b produces the relighting image by using at least the shape information and the first virtual light source condition (or by using at least the shape information and the second virtual light source condition when the second virtual light source condition is set). An output image as the relighting image subjected to other processes in the image processor 20 as needed after being produced by the relighting image producer 20b is stored to an image recorder 300 such as a semiconductor memory or an optical disc. A display device 200 may display the output image.

The camera 1 further includes the selector 30. The selector 30 includes a main object selector 30a as an object selector and a final image selector 30b as an image selector. The main object selector 30a selects, when the produced relighting image includes multiple objects, a main object (specific object) whose position becomes a reference position for setting the first virtual light source condition (and the second virtual light source condition).

The final image selector 30b allows the user, when multiple relighting images respectively corresponding to the above-described first and second virtual light source conditions are produced, to select the output image as the relighting image to be finally output (recorded or displayed).

A system controller 40 is a computer (including a CPU and others) that controls entire operations of the camera 1 including the image capturer 100 and the image processing apparatus 400. A ROM 50 stores various programs executed by the system controller 40 and data used for the execution thereof.

Figure 3:
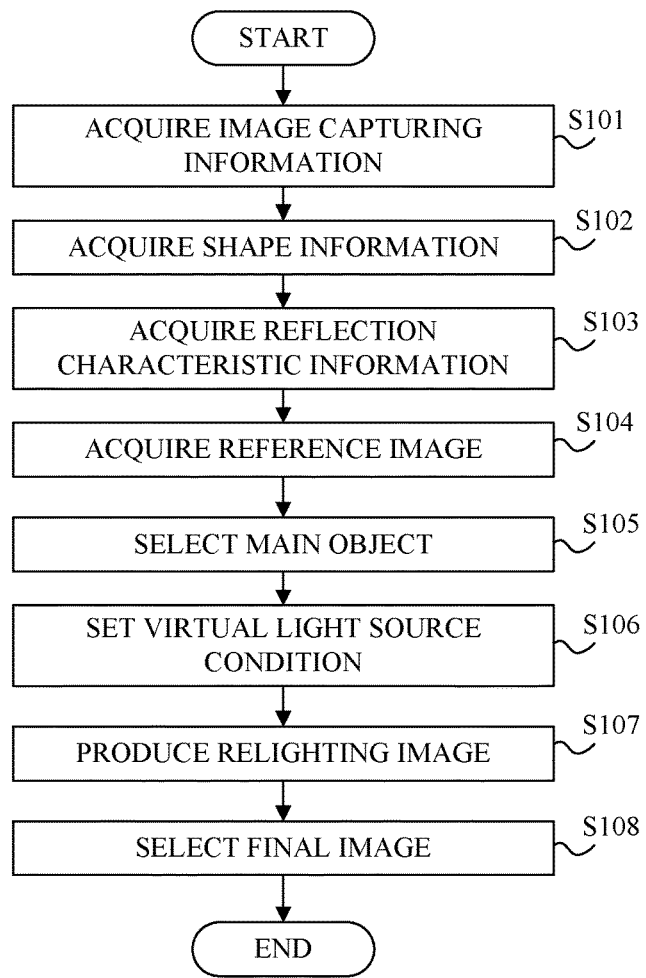
FIG. 3 is a flowchart illustrating an image process in Embodiment 1.

FIG. 3 is a flowchart illustrating an image producing process for producing the relighting image in this embodiment. This image producing process is executed by the image processing apparatus 400 constituted by a computer such as an image processing CPU according to an image processing program as a computer program. However, this image producing process does not necessarily have to be performed by software and may be performed by a hardware circuit.

Figure 4:
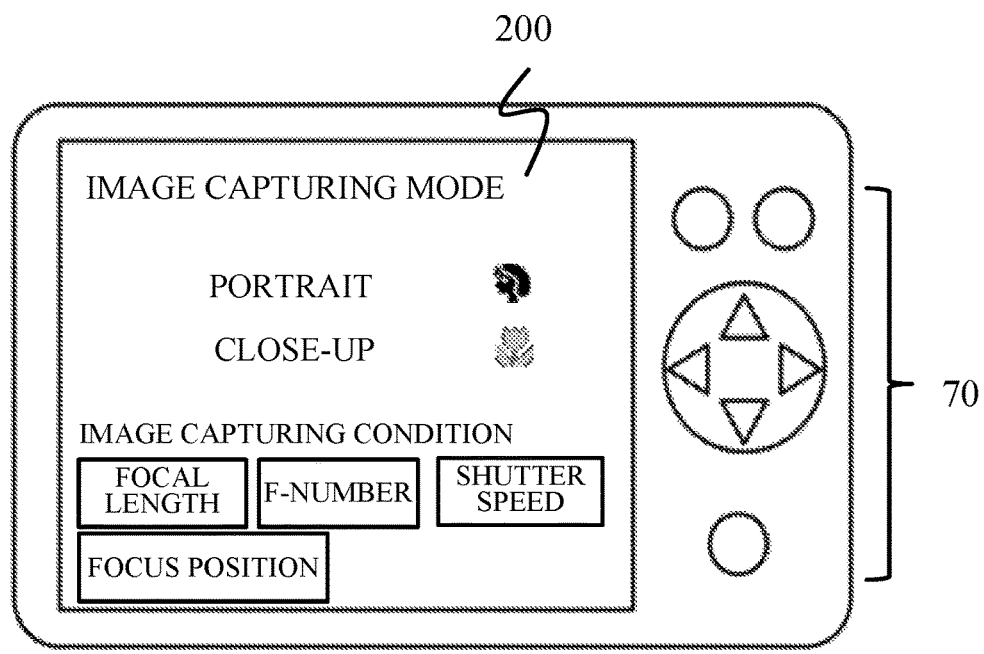
FIG. 4 illustrates image capturing modes and image capturing conditions in Embodiment 1.

At step S101, the image information acquirer 10a acquires the image capturing information corresponding to when acquiring the shape information or the reference image through the image capturer 100, that is, in image capturing. FIG. 4 illustrates a back face of the camera 1. The back face of the camera 1 is provided with the display device 200. The display device 200 displays two relighting image capturing modes ("PORTRAIT (mode)" and "CLOSE-UP (mode)") and the image capturing condition (including "FOCAL LENGTH", "F-NUMBER", "SHUTTER SPEED" and "FOCUS POSITION").

In the relighting image capturing modes, the portrait mode is suitable for image capturing of a person, and the close-up mode is suitable for image capturing of a small object (still object) other than the person. When any one of these relighting image capturing modes is selected, a shutter speed, an F-number, a flush emission condition (lighting condition), sensitivity and others suitable for the selected relighting image capturing mode are automatically set.

The user can select a desired relighting image capturing mode by operating an input button 70 illustrated in FIG. 4. Acquiring the image capturing mode selected by the user, that is, information on the type of the relighting image desired by the user enables setting a representative virtual light source condition in producing the relighting image. FIG. 4 illustrates a state where the portrait mode, which is thickly displayed, is selected.

In addition, the user can select a desired image capturing condition by operating the input button 70.

When the image capturing condition is selected without the relighting image capturing mode being selected by the user, the image capturing information acquirer 10a automatically selects (sets), from the selected image capturing condition, one of the relighting image capturing modes. For example, when the focus position is a position corresponding to a close distance object, the image capturing information acquirer 10a sets the close-up mode. On the other hand, when the focus position is a position corresponding to a middle distance object and the F-number corresponds to a nearly full open aperture, the image capturing information acquirer 10a sets the portrait mode.

The relighting image capturing modes and the setting of the relighting image capturing modes from the image capturing conditions are merely examples, and other relighting image capturing modes may be provided and other relighting image capturing modes may be automatically set from similar image capturing conditions.

Next, at step S102, the shape information acquirer 10b acquires the shape information of the object. Specifically, the shape information acquirer 10b acquires, as the shape information, the depth information (distance information) of the object by a method such as Depth From Defocus using paired or multiple captured images (parallax images) having a parallax or parallaxes and acquired by image capturing of the object through the image capturer 100. The shape information acquirer 10b further acquires, as other shape information, the surface normal information by the above-described photometric stereo method.

Next, at step S103, the reflection characteristic information acquirer 10c acquires the above-described reflection characteristic information of the object.

Figure 5:
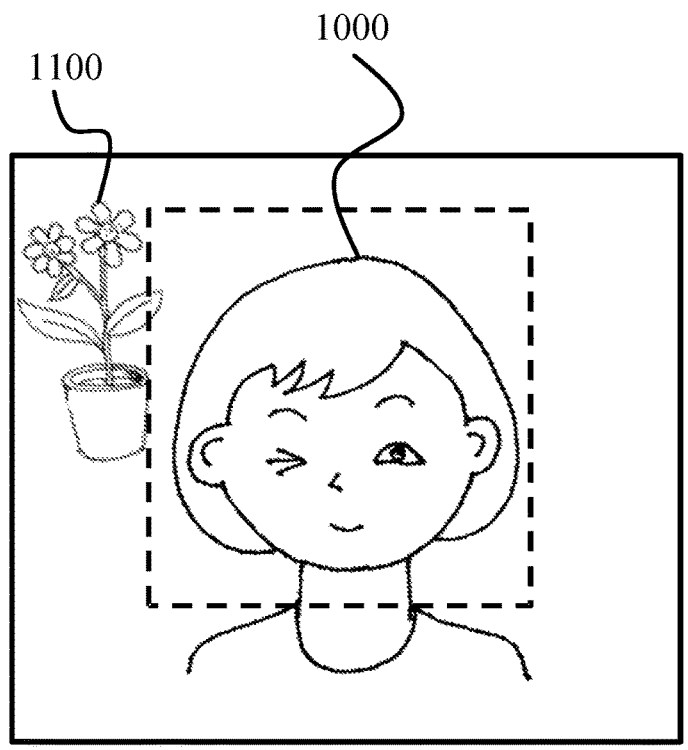
FIG. 5 illustrates a reference image in Embodiment 1.
Figure 6:
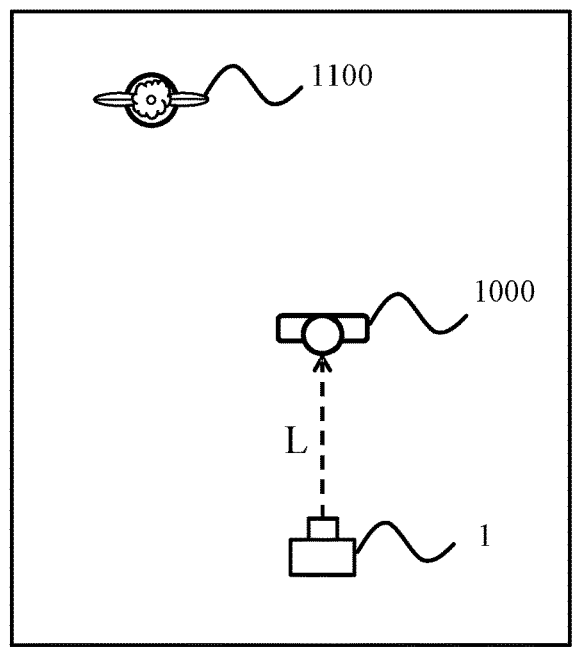
FIG. 6 illustrates an arrangement of the camera, a main object and a background object in Embodiment 1.

Next, at step S104, the reference image acquirer 10d acquires the reference image of the object. FIG. 5 illustrates an example of the reference image acquired through the image capturer 100. This reference image is one portrait image including, as objects, a person 1000 and a flower 1100 in a background of the person 1000. Furthermore, FIG. 6 is a top view of an arrangement of the person 1000, the flower 1100 and the camera 1 in image capturing for acquiring the reference image illustrated in FIG. 5. A distance from the camera 1 to the person 1000 is denoted by L.

The processes at steps S101 to S104 may be performed in orders different from that illustrated in FIG. 3.

Next, at step S105, the main object selector 30a selects the main object as the specific object from the multiple objects (1000 and 1100) in the reference image. The main object selector 30a may select the main object in response to a user's operation of the input button 70 or in response to a user's operation (a touch operation on an image part including the main object) on a touch panel provided in the display device 200. Alternatively, the main object selector 30a may select the main object by using an image recognizing process such as a face detecting process. In this embodiment, description will be made of a case where the person 1000 surrounded by a broken line in FIG. 5 is selected as the main object by the face detecting process.

Figure 7:
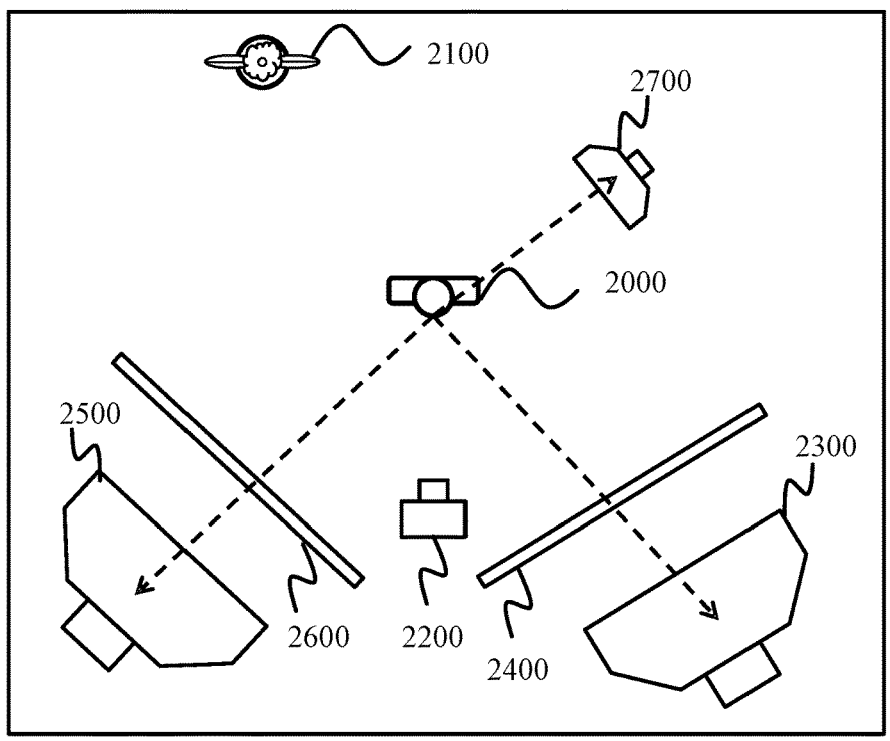
FIG. 7 illustrates a first virtual light source condition in Embodiment 1.

Next, at step S106, the virtual light source condition setter 20a sets the virtual light source condition. With referring to FIG. 7, description will be made of a procedure of setting the virtual light source condition. FIG. 7 illustrates an example of the virtual light source condition in a relighting image space. A person 2000 and a flower 2100 are identical respectively to the person 1000 and the flower 1100 illustrated in FIGS. 5 and 6. However, these person 2000 and flower 2100 in FIG. 7 are reconstructed in the relighting image space by using the shape information, and therefore reference numerals different from those in FIG. 5 are provided thereto. In addition, FIG. 7 is provided for describing a conceptual positional relation of the objects (2000 and 2100), the camera 1 (2200) and others, and thus in an actual process the reconstruction of the objects in the relighting image space as a virtual three-dimensional space is not necessarily needed.

First, as a viewpoint position (corresponding to a position of the camera 1 and hereinafter referred to as "a camera position") 2200 and the image capturing condition that are set for producing the relighting image, the camera position and the image capturing condition in the image capturing for acquiring the reference image at step S104 (or in acquiring the shape information at step S102) are used. This setting makes an angle of view and a composition of the produced relighting image equal to those in the image capturing, which enables producing a relighting image in which a user's image capturing intention is reflected. The camera position 2200 is set depending on the depth information (distance information) that is part of the shape information acquired at step S102. In this embodiment, the camera position 2200 is set at a position at the object distance L to the person 2000 as the main object. As just described, in this embodiment, the position of the main object selected at step S105 is used as the reference position in the relighting image space.

Next, the virtual light source condition setter 20a sets the virtual light source condition depending on the image capturing information acquired by the image capturing information acquirer 10a. In this embodiment, the virtual light source condition setter 20a acquires, as the image capturing information, information indicating that the portrait mode is selected (that is, the portrait mode is directly selected or automatically selected depending on the image capturing condition).

As a representative (typical) lighting method for the portrait image capturing, for example, Rembrandt lighting is known that lights a person from a 45-degree direction with respect to a ridge of his/her nose to emphasize a stereoscopic effect of the person. Thus, the virtual light source condition setter 20a sets, as the first virtual light source condition in the portrait mode, a light source condition that the light source is disposed at an infinite far position in a 45-degree direction with respect to an optical axis of the camera 1, which corresponds to the representative lighting method. The virtual light source condition setter 20a sets as the first virtual light source condition in the other relighting image capturing mode (close-up mode), a light source condition corresponding to a representative lighting method for that relighting image capturing mode. The virtual light source condition setter 20a sets the first virtual light source condition corresponding to a most conformable one of the multiple types of the relighting images to the image capturing condition.

In this embodiment, the virtual light source condition setter 20a further sets the first virtual light source condition depending on the shape information of the main object. A determination can be made of a direction and a position of a face of the main object (person) from the shape information. Therefore, use of the shape information enables accurately setting the first virtual light source condition. In the example of FIG. 7, a main light source 2300 and a diffuser board 2400 are disposed in a right 45-degree direction with respect to a front direction of a face of the person 2000. Use of the diffuser board 2400 makes it possible to express a shadow on the face softly. Furthermore, in the example of FIG. 7, a sub light source 2500 and a diffuser board 2600 are disposed in a left 45-degree direction with respect to the front direction of the face. The sub light source 2500 disposed at a position symmetric with the main light source 2300 with respect to the person 2000 enables adjusting a contrast of shading on the face. Moreover, since the portrait mode is selected, it is guessed that the user wants to emphasize the person 2000. Therefore, placing a backlight 2700 behind (in FIG. 7, at the back right of) the person 2000 enables emphasizing her shiny hair and highlighting the shape of the person 2000.

The virtual light source condition setter 20a thus sets, in the portrait mode, the virtual light source illustrated in FIG. 7 as the first virtual light source condition. As described above, the virtual light source condition includes not only conditions relating to the positions, intensities, wavelengths and sizes of the main and sub light sources 2300 and 2500, but also a condition relating to auxiliary equipment such as the positions and diffusion characteristics of the diffuser boards 2400 and 2600.

Data of the first virtual light source conditions corresponding to the respective relighting image capturing modes are stored in a ROM 20c provided in the image processor 20. In the ROM 20c, the data of the first virtual light source conditions corresponding to the respective relighting image capturing modes may be stored as table data.

Figure 8:
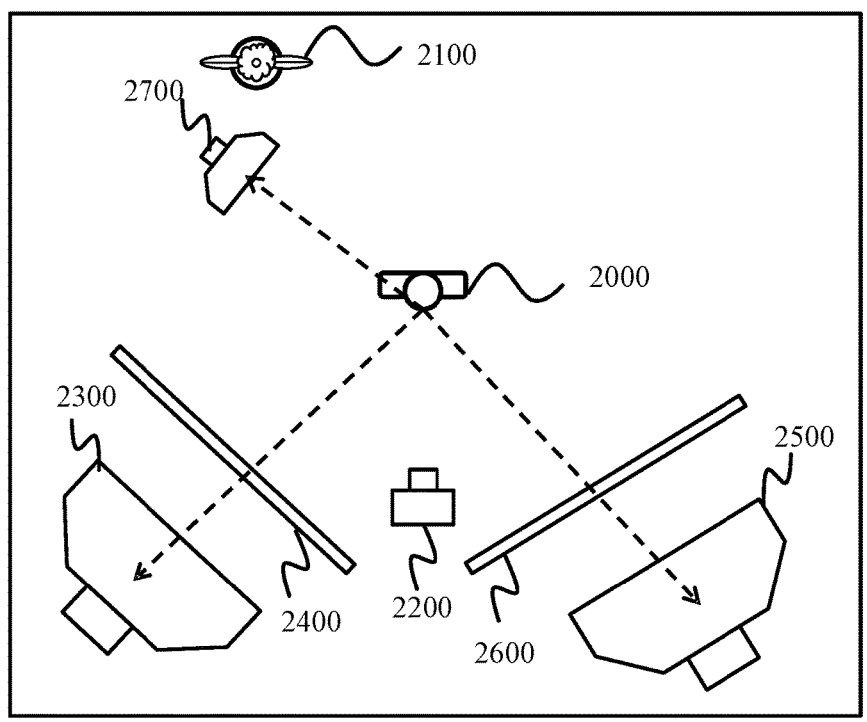
FIG. 8 illustrates a second virtual light source condition in Embodiment 1.

Next, the virtual light source condition setter 20a sets, depending on the image capturing information or the first virtual light source condition and on the shape information, at least one second virtual light source condition. FIG. 8 illustrates one second virtual light source condition. This second virtual light source condition is identical in its basic part to that of the first virtual light source condition. That is, the second virtual light source condition is a condition that, as compared with the first virtual light source condition, the positions of the main and sub light sources 2300 and 2500, the diffuser boards 2400 and 2600 and the backlight 2700 are changed so as to be horizontally inverted with respect to the person 2000. That is, the main light source 2300 and the diffuser board 2400 are disposed in the left 45-degree direction with respect to the front direction of the face of the person 2000, the sub light source 2500 and the diffuser board 2600 are disposed in the right 45-degree direction and the backlight 2700 is disposed left side behind the person 2000.

In the second virtual light source condition, the main light source 2300, the sub light source 2500, the backlight 2700 and the diffuser boards 2400 and 2600 may have the same characteristics as those in the first virtual light source condition and may have different characteristics therefrom. In this embodiment, the main light source 2300, the sub light source 2500 and the backlight 2700 have the same characteristics as those in the first virtual light source condition.

Although in this embodiment the first and second virtual light source conditions are set, the second virtual light source condition does not necessarily have to be set. In other words, it is enough that at least the first virtual light source condition be set.

In addition, multiple second virtual light source conditions mutually different may be set. When only the first virtual light source condition is set, since only one relighting image is produced, the work load of the user or the image editor for setting the virtual light source condition can be most reduced. Furthermore, when at least one second virtual light source condition is set, multiple relighting images including the relighting image corresponding to the first virtual light source condition are produced, which can increase user-selectable relighting images.

Next, at step S107, the relighting image producer 20b produces the relighting image by using the shape information, the reflection characteristic information, the virtual light source condition (first and second virtual light source conditions) and the reference image. Since intensities and directions of light rays reaching respective points of the object depend on the virtual light source condition, the luminance values of the relighting image can be uniquely set, from the reflection characteristic information, as values of a function of the surface normal information and the above-described viewpoint positions. In addition, as described above, use of the reference image enables reducing image quality degradation of the relighting image like the texture mapping method.

When an object making it difficult to produce the relighting image, such as a specular object or a transparent object, is present, replacing an image region including such an object by the reference image enables producing a relighting image with a higher image quality. When the object making it difficult to produce the relighting image is not present, use of the reference image is not necessarily needed.

Figures 9A, 9B, 9C:
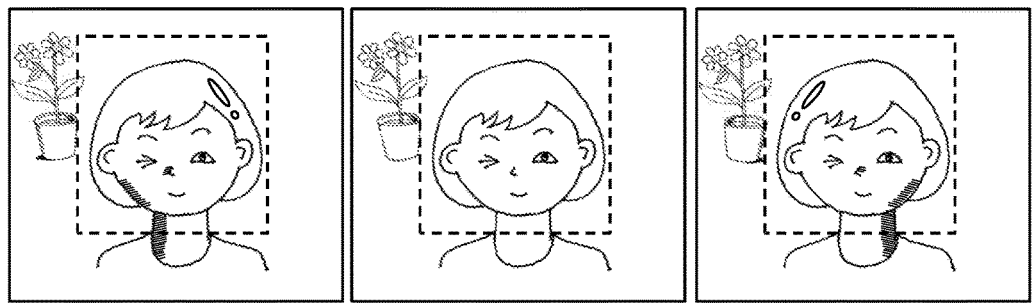
FIGS. 9A to 9C illustrate virtual light source images and a reference image in Embodiment 1.

FIGS. 9A to 9C illustrate the produced relighting images and the reference image. FIG. 9A illustrates the relighting image corresponding to the first virtual light source condition set at step S106. FIG. 9B illustrates the reference image acquired at step S104. FIG. 9C illustrates the relighting image corresponding to the second virtual light source condition set at step S106.

The reference image illustrated in FIG. 9B is an image acquired by image capturing of the main object with flash light projected only from its front, and therefore almost no shading is generated on the face of the main object.

The two relighting images illustrated in FIGS. 9A and 9C are images in which shadings are generated on a left side and a right side of the face by being lighted from its right side and left side with light from the main light source 2300 and thereby a stereoscopic effect of the main object in each image is emphasized. In addition, each of the relighting images is an image in which an effect of the backlight 2700 makes hair of the main object shiny and thereby a texture of the hair is emphasized. However, these two relighting images are acquired with the light sources whose positions are horizontally inverted and thus are images with mutually different expressions. The two relighting images and the reference image illustrated in FIGS. 9A to 9C are displayed on the display device 200, which allows the user to see each image on the display device 200.

Next, at step S108, the final image selector 30b selects, from the relighting image(s) displayed on the display device 200, one relighting image as an output image selected by the user. This image selection may be performed in response to a user's operation of the input button 70 or in response to a user's operation (that is, a touch operation on the relighting image) on the touch panel provided in the display device 200. Alternatively, another configuration may be employed that the final image selector 30b evaluates, for example, a balance between a bright part and a dark part of the produced relighting image to automatically select the output image. Multiple relighting images may be selected as the output images. Moreover, together with or separately from the relighting image, the reference image may be selected as the output image.

The final image selector 30b thus selecting the one (or multiple) output image displays the output image on the display device 200 and records (stores) the output image to the image recorder 300. Storing only the output image reduces a recording capacity required for the image recorder 300 as compared with a case of recording the output image with other images. Then, the process is ended.

As described above, this embodiment automatically sets the virtual light source condition depending on the image capturing information (that is, the relighting image capturing mode or the image capturing condition) and the shape information to produce the relighting image. Thereby, this embodiment enables easily producing the relighting image corresponding to an object expression desired by the user, which makes it possible to reduce a user's work load in setting the virtual light source condition.

Embodiment 2

Figure 10:
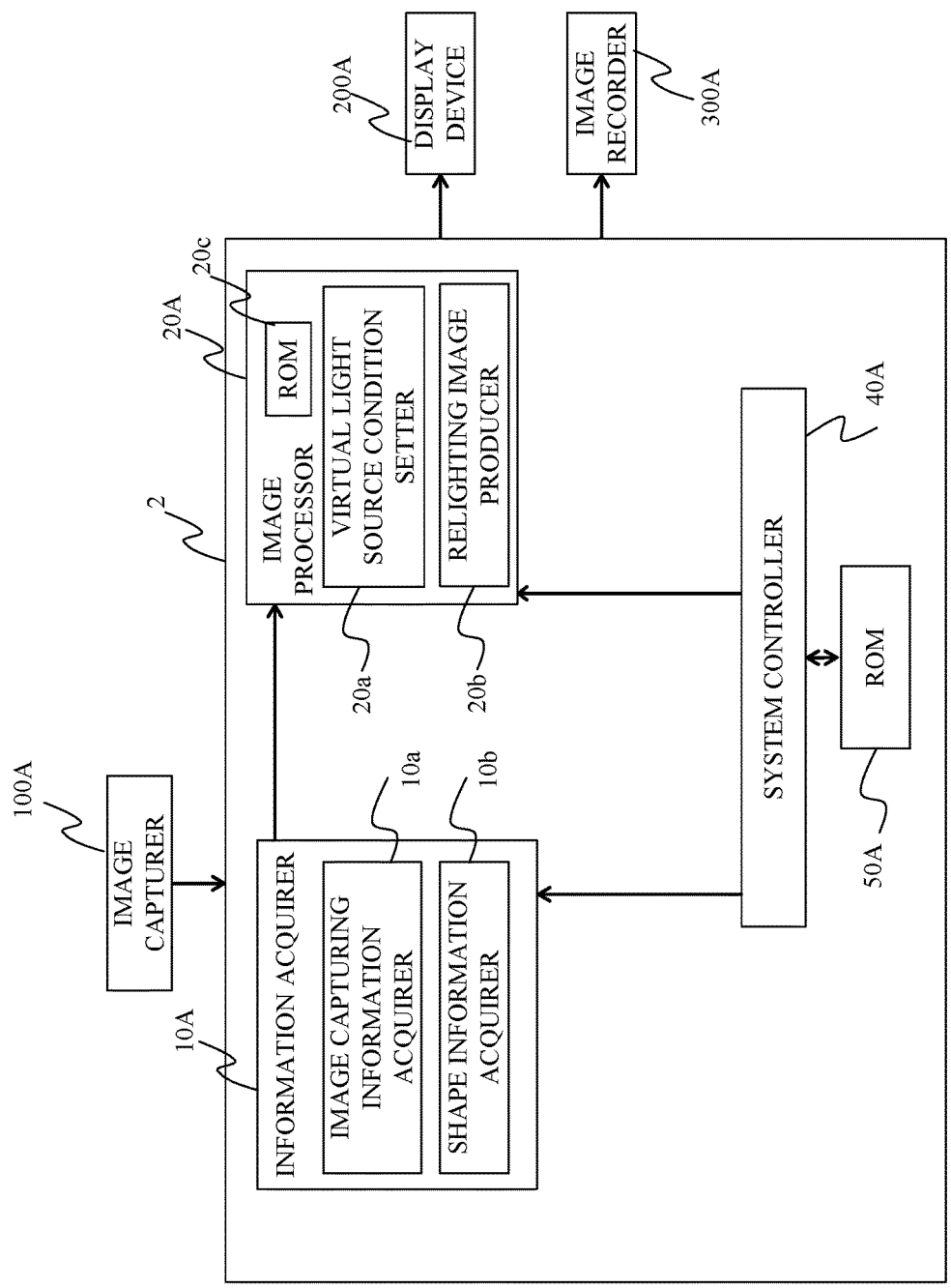
FIG. 10 is a block diagram illustrating a configuration of an image processing apparatus that is Embodiment 2 of the present invention.

FIG. 10 illustrates an image processing apparatus 2 that is a second embodiment (Embodiment 2) of the present invention. The image processing apparatus 2 is separate from an image capturer 100A, a display device 200A and an image recorder 300A and is communicably connected thereto through a wired or wireless communication system. The image capturer 100A has the same configuration as that of the image capturer 100 in Embodiment 1. The display device 200A and the image recorder 300A may also have the same configurations as those of the display device 200 and the image recorder 300 in Embodiment 1 or may be a monitor and a memory included in an external computer.

The image processing apparatus 2 includes an information acquirer 10A and an image processor 20A. The information acquirer 10A includes the image capturing information acquirer 10a and the shape information acquirer 10b both described in Embodiment 1. The information acquirer 10A is different from in Embodiment 1 in that it does not include the reflection characteristic information acquirer 10c and the reference image acquirer 10d. This embodiment uses, as the reflection characteristic, Lambert reflection. A reflectance of the Lambert reflection may be a fixed value since a product of the reflectance and an incident light intensity affects luminance of the relighting image. In this case, luminance values of the relighting image can be calculated as values of a function only of the virtual light source condition including the incident light intensity and of the shape information. Therefore, in this embodiment, it is not necessary to acquire parameters of a reflection model. However, the calculation of the luminance values of the relighting image depending on the virtual light source condition is made by implicitly assuming the reflection characteristic, which means that the calculation uses the reflection characteristic information.

The image processor 20A includes the virtual light source condition setter 20a and the relighting image producer 20b both described in Embodiment 1. An output image as the relighting image subjected to other processes in the image processor 20 as needed after being produced by the relighting image producer 20b is stored to the image recorder 300A such as a semiconductor memory or an optical disc. The display device 200A may display the output image.

The image processing apparatus 2 is different from in Embodiment 1 in that it does not include the selector 30. The selection of the main object is made by regarding an in-focus position on an optical axis of the image capturer 100A as a position of the main object. The in-focus position is acquired from the focus position included in the image capturing condition. In addition, in this embodiment, only one relighting image is output as the output image. Thus, it is not necessary to select the output image.

Figure 11:
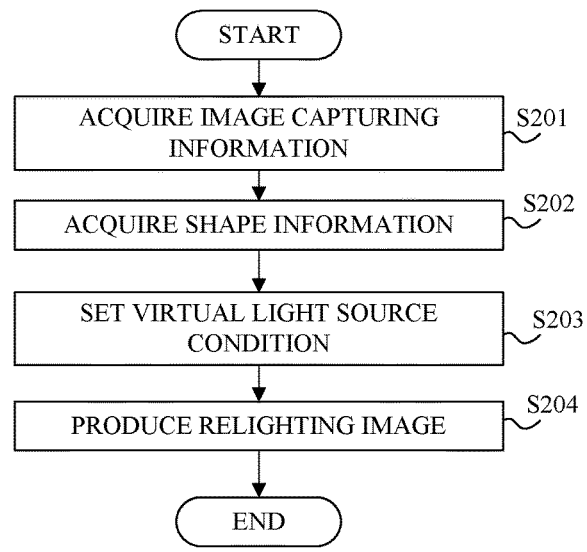
FIG. 11 is a flowchart illustrating an image process in Embodiment 2.

FIG. 11 is a flowchart illustrating an image producing process for producing the relighting image in this embodiment. This image producing process is executed by the image processing apparatus 2 constituted by a computer such as an image processing CPU according to an image processing program as a computer program. However, this image producing process does not necessarily have to be performed by software and may be performed by a hardware circuit.

At step S201, the image information acquirer 10a acquires the image capturing information corresponding to when acquiring the shape information (the relighting image capturing mode or the image capturing condition each described in Embodiment 1) through the image capturer 100A, that is, in image capturing.

Next, at step S202, the shape information acquirer 10b acquires the shape information of the object (the depth information and the surface normal information both described in Embodiment 1). However, in this embodiment, the shape information acquirer 10b acquires the surface normal information by differentiating (or taking difference of) the depth information.

The shape information acquirer 10b may acquire, from the image capturer 100A, the depth information and the surface normal information both calculated by the image capturer 100A or may receive, from the image capturer 100A, information used for calculating the depth information and the surface normal information to calculate the depth information and the surface normal information.

Figure 12:
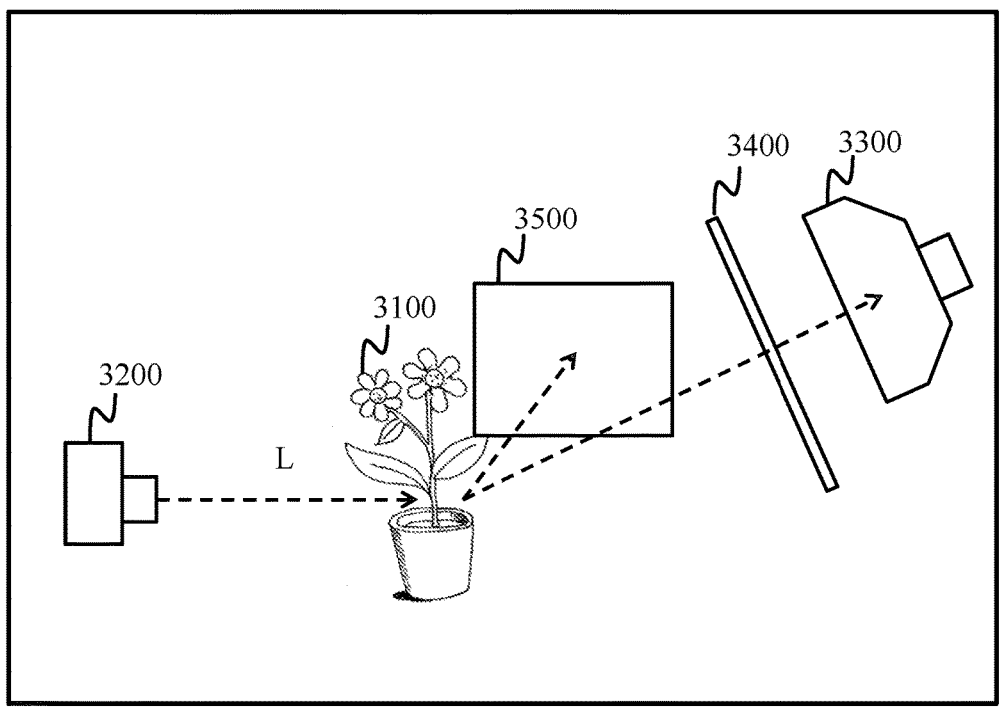
FIG. 12 illustrates a first virtual light source condition in Embodiment 2.

Next, at step S203, the virtual light source condition setter 20a sets the virtual light source condition. With referring to FIG. 12, description will be made of a procedure of setting the virtual light source condition. FIG. 12 illustrates an example of the virtual light source condition in a relighting image space. A flower 3100 is a main object as a target for still life image capturing and is reconstructed in the relighting image space by using the shape information.

FIG. 12 is provided for describing a conceptual positional relation of the object (3100), the image capturer (3200) and others, and thus in an actual process the reconstruction of the object in the relighting image space as a virtual three-dimensional space is not necessarily needed.

First, as a viewpoint position (corresponding to a position of the image capturer 100A and hereinafter referred to as "a camera position") 3200 and the image capturing condition that are set for producing the relighting image, the camera position and the image capturing condition in image capturing for acquiring the shape information at step S202 are used. This setting makes an angle of view and a composition of the produced relighting image equal to those in the image capturing, which enables producing a relighting image in which a user's image capturing intention is reflected. The camera position 3200 is set at a position at a distance L from a position of the flower 3100 that is the main object by regarding an in-focus position, which is acquired from the in-focus position included in the image capturing condition, on the optical axis of the image capturer 100A as the position of the flower 3100. As just described, this embodiment uses the in-focus position on the optical axis of the image capturer 100A in acquiring the shape information (that is, in image capturing) as a reference position of the relighting image space.

Next, the virtual light source condition setter 20a sets the virtual light source condition depending on the image capturing information acquired by the image capturing information acquirer 10a. In this embodiment, the virtual light source condition setter 20a acquires, as the image capturing information, information indicating that the close-up mode is selected (that is, the close-up mode is directly selected or automatically selected depending on the image capturing condition).

As a representative (typical) lighting method for the close-up (still life) image capturing, for example, semi-backlighting is known that lights an object from a rear upper 45-degree direction to emphasize a stereoscopic effect of the object. Thus, the virtual light source condition setter 20a sets, as the first virtual light source condition in the close-up mode, a light source condition that the light source is disposed at an infinite far position in a 45-degree upward direction with respect to the optical axis of the image capturer 100A, which corresponds to the representative lighting method. The virtual light source condition setter 20a sets, in the other relighting image capturing mode (portrait mode), a light source condition corresponding to a representative illumination method for that relighting image capturing mode as the first virtual light source condition. In this embodiment, the virtual light source condition setter 20a further sets the first virtual light source condition depending on the shape information of the main object. A determination can be made of directions and positions of concave and convex portions of the main object from the shape information.

Therefore, use of the shape information enables accurately setting the first virtual light source condition. In the example of FIG. 12, a main light source 3300 and a diffuser board 3400 are disposed in the rear upper 45-degree direction from the flower 3100. Use of the diffuser board 3400 makes it possible to express shadows on flower's petals and leaves softly. Furthermore, in the example of FIG. 12, a reflector board 3500 is disposed in a side direction of the flower 3100. This reflector board 3500 enables adjusting a contrast of shading on the petals and leaves.

The virtual light source condition setter 20a thus sets, in the close-up mode, the virtual light source illustrated in FIG. 12 as the first virtual light source condition. The virtual light source condition includes, as described in Embodiment 1, not only the condition relating to the position, the intensity, wavelength and size of the main light source 3300, but also the condition relating to auxiliary equipment such as the positions and diffusion and reflection characteristics of the diffuser and reflector boards 3400 and 3500. Data of the first virtual light source conditions corresponding to the respective relighting image capturing modes are stored in a ROM 20c provided in the image processor 20A. In the ROM 20c, the data of the first virtual light source conditions corresponding to the respective relighting image capturing modes may be stored as table data.

Next, at step S204, the relighting image producer 20b produces the relighting image by using the shape information and the first virtual light source condition. Intensities and directions of light rays reaching respective points of the object depend on the virtual light source condition. Furthermore, as described above, this embodiment uses the Lambert reflection as the reflection characteristic. In this case, luminance values of the relighting image can be calculated as values of a function only of the first virtual light source condition including intensities of the incident (reaching) light rays and of the shape information.

The output image thus produced as the relighting image is displayed on the display device 200 in order to allow the user to see the output image and is recorded (stored) to the image recorder 300. Then, the process is ended.

This embodiment also automatically sets, as in Embodiment 1, the virtual light source condition depending on the image capturing information (that is, the relighting image capturing mode or the image capturing condition) and the shape information to produce the relighting image. Thereby, this embodiment enables easily producing the relighting image corresponding to an object expression desired by the user, which makes it possible to reduce a user's work load in setting the virtual light source condition.

Furthermore, this embodiment does not include, as described above, the reflection characteristic acquirer 10c and the reference image acquirer 10d both described in Embodiment 1 and expresses the reflection characteristic by using a simple model. Therefore, this embodiment can simplify the configuration of the image processing apparatus 2. Moreover, this embodiment substitutes the in-focus position for the position of the main object and does not include the selector 30 because of setting only one virtual light source condition. Accordingly, this embodiment can further simplify the configuration of the image processing apparatus 2.

As described above, each of the embodiments automatically sets the virtual light source condition depending on the selected type of the virtual light source image or on the image capturing condition. Therefore, each embodiment enables producing the selected type virtual light source image while reducing a user's work load in setting the virtual light source condition.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-007693, filed on Jan. 19, 2016, which is hereby incorporated by reference herein in its entirety.

What is claimed is:

1. An image processing apparatus configured to produce a virtual light source image that is an image of an object lighted by a virtual light source, the apparatus comprising:
   a memory configured to store instructions; and
   at least one processor configured to execute the instructions to provide:
      a shape acquirer configured to acquire shape information relating to a shape of the object;
      a light source condition setter configured to set a first virtual light source condition as a condition relating to a virtual light source, depending (a) on an image capturing mode indicating a type of a captured image acquired by image capturing of the object, (b) on image type information indicating a selected one of multiple types of the virtual light source images or (c) on an image capturing condition selected in the image capturing; and
      an image producer configured to produce the virtual light source image by using the first virtual light source condition and the shape information.

2. An image processing apparatus according to claim 1, wherein the shape information includes information on at least one of a depth of the object and a surface normal to the object.

3. An image processing apparatus according to claim 1, wherein the light source condition setter is configured to set the first virtual light source condition depending on the shape information.

4. An image processing apparatus according to claim 1, wherein the at least one processor is further configured to execute instructions to provide a reflection characteristic acquirer configured to acquire reflection characteristic information relating to a reflection characteristic of the object, and wherein the image producer is configured to produce the virtual light source image by using the first virtual light source condition, the shape information, and the reflection characteristic information.

5. An image processing apparatus according to claim 1, wherein the condition relating to the virtual light source includes at least one of a position and a direction of the virtual light source.

6. An image processing apparatus according to claim 1, wherein the light source condition setter is configured to set the first virtual light source condition corresponding to a most conformable one of the multiple types of the virtual light source images to the image capturing condition.

7. An image processing apparatus according to claim 1,
   wherein the at least one processor is further configured to execute instructions to provide a reference image acquirer configured to acquire a reference image produced by image capturing of the object, and
   wherein the image producer is configured to the virtual image light source image by using the first virtual light source condition, the shape information and the reference image.

8. An image processing apparatus according to claim 1, wherein the light source condition setter is configured to set the first virtual light source condition depending on the image capturing condition selected in the image capturing for acquiring the reference image.

9. An image processing apparatus according to claim 1,
   wherein the at least one processor is further configured to execute instructions to provide an object selector configured to select a specific object from multiple objects, and
   wherein the light source condition setter is configured to set the first virtual light source condition depending on the shape information of the specific object.

10. An image processing apparatus according to claim 1, wherein the light source condition setter is configured to set at least one second virtual light source condition different from at least part of the first virtual light source condition, and
    the image producer is configured to produce multiple virtual light source images by using the first and second virtual light source conditions.

11. An image processing apparatus according to claim 10, wherein the at least one processor is further configured to execute instructions to provide an image selector configured to select an output image from the multiple virtual light source images.

12. An image capturing apparatus comprising:
    an image capturer configured to capture an optical image of an object; and
    an image processing apparatus configured to produce a virtual light source image that is an image of an object lighted by a virtual light source, wherein the image processing apparatus comprises:
    a memory configured to store instructions; and
    at least one processor configured to execute the instructions to provide:
       a shape acquirer configured to acquire shape information relating to a shape of the object;
       a light source condition setter configured to set a first virtual light source condition as a condition relating to a virtual light source, depending (a) on an image capturing mode indicating a type of a captured image acquired by image capturing of the object, (b) on image type information indicating a selected one of multiple types of the virtual light source images or (c) on an image capturing condition selected in the image capturing; and an image producer configured to produce the virtual light source image by using the first virtual light source condition and the shape information.

13. An image processing method for producing a virtual light source image that is an image of an object lighted by a virtual light source, the method comprising using at least one processor to:

acquire shape information relating to a shape of the object;

set a first virtual light source condition as a condition relating to a virtual light source, depending (a) on an image capturing mode indicating a type of a captured image acquired by image capturing of the object, (b) on image type information indicating a selected one of multiple types of the virtual light source images, or (c) on an image capturing condition selected in the image capturing; and produce the virtual light source image by using the first virtual light source condition and the shape information.

14. A non-transitory computer-readable storage medium storing an image processing program as a computer program for causing a computer to produce a virtual light source image that is an image of an object lighted by a virtual light source, the program causing the computer to:

acquire shape information relating to a shape of the object;

set a first virtual light source condition as a condition relating to a virtual light source, depending (a) on an image capturing mode indicating a type of a captured image acquired by image capturing of the object, (b) on image type information indicating a selected one of multiple types of the virtual light source images or (c) on an image capturing condition selected in the image capturing; and produce the virtual light source image by using the first virtual light source condition and the shape information.

* * * * *